Aug. 17, 1937.                R. S. HOPKINS                2,090,045
                        NEGATIVE HOLDER FOR ENLARGERS
                         Filed March 28, 1936        2 Sheets-Sheet 1

Roy S. Hopkins,
            INVENTOR:
BY
                ATTORNEYS.

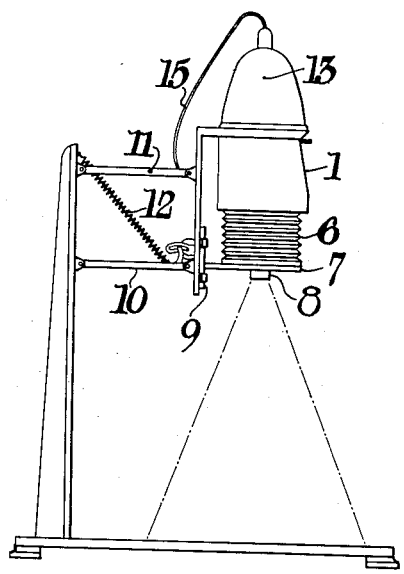

Patented Aug. 17, 1937

2,090,045

UNITED STATES PATENT OFFICE 2,090,045

NEGATIVE HOLDER FOR ENLARGERS

Roy S. Hopkins, Rochester, N. Y., assignor, by mesne assignments, to Eastman Kodak Company, Jersey City, N. J., a corporation of New Jersey Application March 28, 1936, Serial No. 71,473

16 Claims. (Cl. 88—24)

This invention relates to photography and more particularly to negative holders for enlargers. One object of my invention is to provide a negative holder which can be loaded and unloaded with extreme rapidity. Another object of my invention is to provide a negative holder which is adapted to accurately position a sheet of flexible film between a pair of frames in the focal plane of the camera objective. Another object of my invention is to provide a negative holder comprising two cooperating frames, one movable relative to the other for inserting and removing the film. Still another object of my invention is to provide a negative holding apparatus in which one of the frames may be swung to and from a loading position and to provide a means for automatically holding and releasing a negative. Still another object of my invention is to provide a negative holder with a clamp which will be automatically released as the negative holder approaches a loading position and a clamp which will be automatically actuated by placing a negative into the holder, and other objects will appear from the following specification, the novel features being particularly pointed out in the claims at the end thereof.

Many studios make negatives of a standard size, and from these negatives they produce the final portraits by means of projection printing or enlarging. It is consequently desirable to provide an enlarger adapted to receive a standard size negative so that an apparatus can be so arranged that the negative can be quickly and accurately located in and removed from the enlarging apparatus.

In my Patent No. 1,247,402, issued November 20, 1917, I have shown an automatically focusing enlarging camera which is suitable for use with my present invention. I have diagrammatically illustrated a device of the kind shown in the drawings of the patent.

Coming now to the drawings, wherein like reference characters denote like parts throughout:

Fig. 2 is a side elevation of a typical installation of my invention in an automatically focusing enlarger of a known type.

Fig. 3 is an enlarged fragmentary section through a portion of the enlarger and through a negative holder constructed in accordance with my invention, and Fig. 4 is an enlarged sectional view through the movable negative holding frame showing the automatic latch construction by which the negative is both attached to and released from the negative holding frame.

Figure 1:
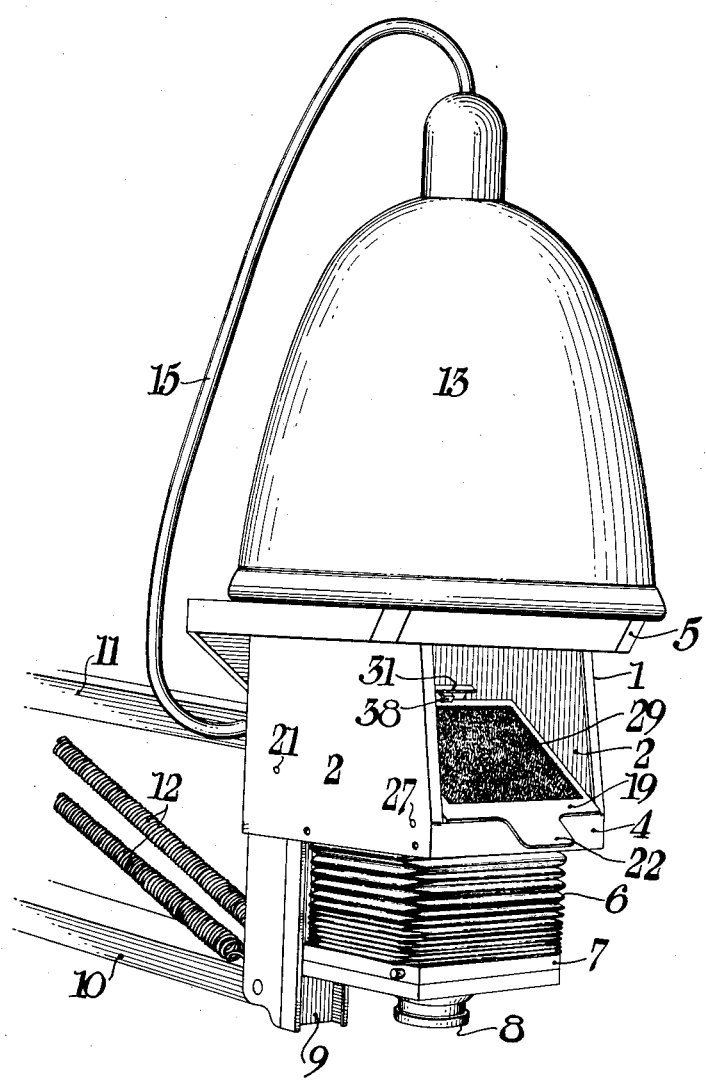
Fig. 1 is a fragmentary perspective view of an enlarger equipped with a negative holder constructed in accordance with and embodying a preferred form of my invention.

My invention comprises broadly a negative holder of two cooperating frames, one of which may be swung to and from the other frame so that it may reach a loading position in which a negative can be readily positioned.

In accordance with the showing of Fig. 1, I provide a housing 1 having side walls 2, a rear wall 3, a bottom member 4, and a top frame 5.

The bottom member 4 may support the upper end of a bellows 6, the opposite end of which is attached to a lens board 7 in the usual manner, being adapted to support an objective 8. This lens board 7 may move on a track 9 in any suitable manner, and if the enlarger should be of the automatically focusing type, the structure may be the same as that shown in my patent above referred to, in which a pair of parallel arms 10 and 11 are used to support the enlarging camera, springs 12 tending to hold the apparatus in a set position.

The upper frame 5 may support a standard type of reflector 13 in which a lamp 14 is mounted, this lamp being connected by a core 15 to a suitable source of power.

Coming now to my invention, the upper frame 5 is provided with an opening 16 of a size to receive a negative N, the edges of which E are adapted to be engaged by the edges 17 of the frame.

The negative N is likewise to be engaged at its edges by the edges 18 of a second frame member 19 which is provided with a pair of oppositely disposed, downwardly extending arms 20 pivoted at 21 to the housing 1 and adapted to swing on this pivot from the full line position in Fig. 3 to the broken line position in the same figure. There is a handle 22 extending outside of the housing 1 and a downwardly extending flange 23 extends entirely across the front edge of the frame, this flange being primarily for strengthening the frame.

On the underneath side of the frame 19, there is a spring member 24, this spring member being adapted to be engaged by rollers 25 carried by arms 26, pivotally attached at 27 to the housing 1 and being connected by a plate 28, preferably covered with a soft material, such as plush or felt 29, which will not damage a negative.

The rollers 25 are automatically moved in the direction shown by the arrow in Fig. 3 by means of a spring 30 coiled about the shaft 27 on which the arms 26 are pivoted. These rollers, therefore, through engagement with the spring 24, resiliently clamp the frame member 19 against the frame 16 so that a negative N will be held taut between these two frames.

A negative is shown in an operative position between these frames in Fig. 3. After a print has been made from the negative, in order to remove the negative the platen or felt-covered plate 28 is pressed inwardly in the direction shown by the arrow in Fig. 3, causing the rollers to swing away from the springs 24 and permitting the frame 19 to swing upon its pivots 21 toward its loading position. After a slight thrust upon the platen 28, the handle 22 may be drawn downwardly, or the frame member 19 may be merely allowed to drop. Whichever way is used, as the frame 19 moves downwardly, the clamp 31 which holds an edge E of the negative N is released automatically in the following manner. The clamp member 31 consists of an inverted L-shaped member attached to a pair of arms 32, each of which is pivotally mounted at 33 upon one of the supporting arms 20 of the frame 19. One of the arms 32 may carry a pin 34 extending through a slot 35 in one of the arms 20 to form a releasing mechanism for the clamp.

The arms 32 carry a pin 36 on which a spring member 37 is mounted, this spring member having a flange 38 adapted to normally engage an edge 18 of the frame 19 and to hold the clamp in a raised position by snapping over the edge of the frame 19, as will now be described. As the frame 19 is lowered, turning upon its pivots 21, the pin 34 follows the path shown in the heavy broken line L, moving downwardly until it strikes the beveled edge 40 of a latch member 41, pivoted at 42 to the housing 1, so that the pin 34 will ride across the beveled face of the latch member 41, and as it does so, the arms 32 will be raised from their full line to their dotted line position so that the clamping member 31 will be raised from the negative at about the time the frame 19 reaches the broken line position shown in Fig. 3. The negative will slide by gravity from the frame.

At the time the pin 34 strikes the cam surface 40 and the clamping member is raised, the spring member 38 will engage an upper surface of the frame 19, holding the clamping member in the position shown in broken lines in Fig. 3. In this position, it is ready to receive a negative.

By sliding the negative upwardly against the spring member 38, the end of the spring slides off the end of frame 19, permitting the clamping member 31 to drop down and engage the negative. By swinging the handle 22 upwardly, the negative may be moved into registration with and clamped against frame 16. The upward movement of pin 34 causes the latch member 41 to rock upon its pivot 42 from the full to the broken line position in Fig. 4, and consequently the latch member does not alter the position of the clamp but merely drops down again by gravity to its full line position after the pin 34 has passed.

Before the negative holder reaches its uppermost position, the rollers 25, impelled by the spring 30, engage the spring 24 and exert a resilient pressure upwardly against the frame, thus holding the negative N accurately in a plane.

It would be difficult to slide a negative N across a frame, such as 19, in loading, without causing an edge of the negative to strike an edge of the frame and possibly become scratched. In order to avoid this, as best shown in Fig. 1, the platen 28 which is faced with a soft material such as plush or felt 29 as described above, is of a size and shape to fit neatly in the opening of the frame 19 so that when in a loading position, as shown in Fig. 1, the frame member 19 has its opening completely covered by the felt 29. Thus there is a smooth surface over which a negative may be slid upwardly to engage the clamping member 31 when the spring member 38 is released by being struck with the upper edge of a negative being slid over the frame 19 and the platen 28.

Thus the platen 28 performs two functions: first, the soft covering 29 fills in the opening in the frame 19 when in a loading position, and when the negative has been clamped against the frame 17, the platen 28 fills the aperture in the front of the housing through which the film is loaded and unloaded, thus completing the light-tight casing. In addition, of course, the platen 28, through the pivoted arms 26, carries the rollers 25, which are the sole means for supporting the frame 19 in its operative position. As the arms 26 approach the end of the spring member 24, the mechanical advantage of the arms is considerable, and the frame 19 will securely clamp the negative N in position. In Fig. 3 the rollers have not quite completed their movement, but the spring 24 is definitely under compression. However, a further movement of rollers 25 in the direction shown by the arrow will cause the platen 28 to completely close the opening through which the negative is loaded in the housing 1.

The operation of the loading fixture above described is extremely rapid, since it is designed for a single standard size of negative. The size, of course, can be determined by the requirements of the individual user, and I have in mind providing enlargers with a series of different size negative holding frames which can be selected when purchasing an enlarger.

Assuming a negative is to be enlarged and the apparatus is in the position shown in Fig. 1, the negative is slid over the upper surface of the frame 19 and the soft covering 29 on the platen 28 until the upper edge of the negative engages the spring 38. Since the pressure on this spring is very light, only slight pressure is needed to push the spring member back over the edge of frame 19, thus permitting the clamping member 31 to drop upon and engage an edge of the negative N. The position of the clamping member for holding the negative is shown in Fig. 4. The operator then raises the handle 22 upwardly, and as the frame 19 is moved, the arms 26 and their rollers 25 likewise move about their pivots 27 under the influence of spring 30 until finally the rollers, by compressing the spring 24, clamp frame 19 closely against frame 17 with the negative N stretched taut across the openings. After having made an exposure, the operator presses in slightly on the platen 28 to move rollers 25 out of engagement with spring 24 and at the same time lowers handle 22.

Frame 19 swings downwardly upon the pivots 21, and as the pin 34 reaches the cam edge 40 of the latch 41, the clamp 31 is automatically raised so that the negative slides by gravity out into the waiting hand of an operator. At the same time, the spring member 38 engages the top of the frame 19 and the apparatus is again in the position shown in Fig. 1 in condition to receive another negative.

These operations of loading and unloading can, with only ordinary skill, be made at a very high speed, and at the same time, the negatives can be positioned very accurately.

What I claim as new and desire to secure by Letters Patent of the United States is:

1. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, said platen being adapted to lie against and fill the opening in the second frame when the latter is swung to a negative holding position to facilitate loading.

2. A negative holder for printing machines comprising a frame adapted to support a negative, a second frame hingedly attached to the first to swing from a negative holding position against the first frame to a negative loading at an angle thereto, a platen hingedly mounted with respect to the first and second frames, rollers on the platen adapted to engage the under side of the second mentioned frame to hold the first and second mentioned frames in an operative negative holding position.

3. A negative holder for printing machines comprising a frame adapted to support a negative, a second frame hingedly attached to the first to swing from a negative holding position against the first frame to a negative loading at an angle thereto, a platen hingedly mounted with respect to the first and second frames, rollers on the platen adapted to engage the under side of the second mentioned frame to hold the first and second mentioned frames in an operative negative holding position and a spring for holding the platen in the negative holding position.

4. A negative holder for printing machines comprising a frame adapted to support a negative, a second frame hingedly attached to the first to swing from a negative holding position against the first frame to a negative loading at an angle thereto, a platen hingedly mounted with respect to the first and second frames, against which a negative to be printed may be placed, means on the platen for holding the first and second frames together for clamping said negative therebetween, said holding means being movable with the platen to a film loading position and being the sole means for moving the second negative holding frame.

5. A negative holder for printing machines comprising a frame adapted to support a negative, a second frame hingedly attached to the first to swing from a negative holding position against the first frame to a negative loading at an angle thereto, a platen hingedly mounted with respect to the first and second frames, cooperating tracks and rollers carried by the second negative frame and the platen by which movement of the latter may be transmitted by the former as both parts turn upon their respective hinges.

6. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, the two hinges being oppositely positioned whereby the second frame and platen may turn thereon toward each other into a substantially parallel negative loading in which the platen lies totally across the second mentioned frame filling the opening therein.

7. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, the two hinges being oppositely positioned whereby the second frame and platen may turn thereon toward each other into a substantially parallel negative loading in which the platen lies totally across the second mentioned frame filling the opening therein.

8. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, the two hinges being oppositely positioned whereby the second frame and platen may turn thereon toward each other into a substantially parallel negative loading in which the platen lies totally across the second mentioned frame filling the opening therein, said means consisting of a latch pivotally attached to the second frame member.

9. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, the two hinges being oppositely positioned whereby the second frame and platen may turn thereon toward each other into a substantially parallel negative loading in which the platen lies totally across the second mentioned frame filling the opening therein, said means consisting of a latch pivotally attached to the second frame member, and means operable by moving the second frame upon its hinge for setting the latch in an open position.

10. A negative holder for printing machines comprising a frame adapted to support a negative, a second frame having an opening therein and hingedly attached to the first to swing from a negative holding position against the first frame to a negative loading at an angle thereto, a platen hingedly mounted with respect to the first and second frames, the two hinges being oppositely positioned whereby the second frame and platen may turn thereon toward each other into a substantially parallel negative loading in which the platen lies totally across the second mentioned frame filling the opening therein, said means consisting of a latch pivotally attached to the second frame member, and means operable by moving the second frame upon its hinge for setting the latch in an open position, in the movement away from the first frame, said latch member being releasable from its set position to engage a negative by thrusting an edge of a negative thereagainst.

11. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, and means for releasing said clamp by sliding a negative into contact therewith, whereby a negative properly positioned on the second frame may be moved against the first frame.

12. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, and means for releasing said clamp by sliding a negative into contact therewith, whereby a negative properly positioned on the second frame may be moved against the first frame and may be automatically released only when the second frame is swung toward its loading position.

13. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, a spring latch for holding the clamp in a set position, said spring latch lying in the path of a negative being loaded into the second frame to be released thereby for holding the negative against said second frame.

14. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, a spring latch for holding the clamp in a set position, a pivoted member for engaging and setting the latch operable through movement of the second frame towards a loading position.

15. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, a spring latch for holding the clamp in a set position, a pivoted member for engaging and setting the latch operable through movement of the second frame towards a loading position, and inoperable when said frame is moved towards the first frame to a negative holding position.

16. A negative holder for printing machines comprising a first frame adapted to position one side of a negative, a second frame adapted to position the opposite side thereof, a hinge pintle for moveably supporting the second frame spaced from the first frame, means for moving the frames to and from a negative loading position in which the second frame lies at an angle to the first, a negative clamp on the second frame normally lying in a negative holding position, means for moving the clamp from its normal position to a set position by swinging the second frame upon its hinge to a loading position, a spring latch for holding the clamp in a set position, a pivoted member for engaging and setting the latch operable through movement of the second frame towards a loading position, a negative being adapted to release the spring latch in positioning a negative on the second frame, said pivoted member releasing said negative from said clamp in positioning the second frame for loading.

ROY S. HOPKINS.